US012793120B2

(12) United States Patent
Xu et al.

(10) Patent No.: US 12,793,120 B2
(45) Date of Patent: Nov. 10, 2026

(54) METHODS, NON-TRANITORY COMPUTER READABLE STORAGE MEDIUMS, AND SYSTEMS INCLUDING A MODEL TRAINED TO MAP TEXTUAL DATA FROM SCANNED RECEIPTS TO ITEMS FROM AN ORDER

(71) Applicant: Maplebear Inc., San Francisco, CA (US)

(72) Inventors: Bo Xu, San Francisco, CA (US); Rebecca Riso, Croton-on-Hudson, NY (US); Ashish Sinha, Jersey City, NJ (US); Chencheng Wu, Los Altos, CA (US); Chun-Che Wang, Seattle, WA (US); Kenneth Jason Sanchez, Orange, CA (US)

(73) Assignee: Maplebear Inc., San Francisco, CA (US)

(*) Notice: Subject to any disclaimer, the term of this patent is extended or adjusted under 35 U.S.C. 154(b) by 68 days.

(21) Appl. No.: 18/634,766

(22) Filed: Apr. 12, 2024

(65) Prior Publication Data

US 2025/0322445 A1 Oct. 16, 2025

(51) Int. Cl.
*G06Q 30/00* (2023.01)
*G06Q 30/0601* (2023.01)
*G06V 10/77* (2022.01)
*G06V 30/19* (2022.01)

(52) U.S. Cl.
CPC ..... *G06Q 30/0635* (2013.01); *G06V 10/7715* (2022.01); *G06V 30/19147* (2022.01)

(58) Field of Classification Search
CPC ........... G06Q 30/0635; G06Q 30/0633; G06Q 30/06331; G06Q 30/06332; G06Q 30/06333; G06Q 30/06334; G06Q 30/0637; G06Q 10/083; G06Q 10/087; G06V 10/7715; G06V 30/19147
See application file for complete search history.

(56) References Cited

U.S. PATENT DOCUMENTS 11,257,049 B1 * 2/2022 Durazo Almeida . G06V 30/413
2020/0057903 A1 * 2/2020 Leizerowich .......... H04N 23/80
2020/0168056 A1 * 5/2020 Omiya .................. G06F 3/1263
(Continued)

OTHER PUBLICATIONS

C. Hirway, E. Fallon, p. Connolly, K. Flanagan and D. Yadav, "A Deep Learning Approach for Minimizing False Negatives in Predicting Receipt Emails," 2022 International Conference on Computer and Applications (ICCA), Cairo, Egypt, 2022, pp. 1-7, doi: 10.1109/ICCA56443.2022.10039606. (Year: 2022).*

*Primary Examiner* — Arielle E Weiner
(74) *Attorney, Agent, or Firm* — Fenwick & West LLP

(57) ABSTRACT

An online concierge system trains a computer model to map receipt item labels to order item identifiers, enabling the online concierge system to identify discrepancies between receipt items and customer order items. The online concierge system identifies a training set of data comprising quantities of receipt item labels and corresponding orders having quantities of order item identifiers and trains the computer model to predict quantities of order item identifiers based on the set of training data. The online concierge system applies a one-hot encoding for a receipt item label to determine predicted order item identifiers and maps the receipt item label to order item identifiers based on the predictions.

13 Claims, 9 Drawing Sheets

(56) References Cited

U.S. PATENT DOCUMENTS

| | | | | |
|---|---|---|---|---|
| 2022/0114648 | A1* | 4/2022 | van Horne | G06Q 30/0206 |
| 2022/0300804 | A1* | 9/2022 | Guan | G06N 3/04 |
| 2023/0306493 | A1* | 9/2023 | Downey | G06Q 30/0283 |
| 2024/0020475 | A1* | 1/2024 | Ramos | G06F 40/279 |
| 2024/0312233 | A1* | 9/2024 | Kumar | G06V 30/18 |
| 2024/0354786 | A1* | 10/2024 | Kunwar | G06Q 30/0202 |
| 2025/0131694 | A1* | 4/2025 | Iscen | G06V 10/761 |

* cited by examiner

METHODS, NON-TRANITORY COMPUTER READABLE STORAGE MEDIUMS, AND SYSTEMS INCLUDING A MODEL TRAINED TO MAP TEXTUAL DATA FROM SCANNED RECEIPTS TO ITEMS FROM AN ORDER

BACKGROUND

This disclosure relates generally to ordering an item through an online concierge system, and more specifically to identifying and mapping receipt items to ordered items by the online concierge system.

In online concierge systems, pickers fulfill orders at a physical warehouse, such as a retailer, on behalf of customers as part of an online shopping concierge service. In current online concierge systems, pickers may be sent to various warehouses with instructions to fulfill customer orders for items, and may then find items included in customer orders in a warehouse. In many cases, a picker may also fulfill multiple orders in one visit to the warehouse, such that the picker may collect orders related to multiple orders at one time and separately complete each order (e.g., checking out/paying at the warehouse for each order). As such, for various reasons the ordered items may or may not match items actually collected (and subsequently delivered) for each order. Pickers may collect items that differ from the ordered items or items in addition to the ordered items, pickers may replace unavailable items (e.g., items that are out of stock) with available items (which may not be reflected in an update to the order), and items may become mixed across multiple orders (an item collected for a first order may be checked out or otherwise associated with the items for a second order).

Additionally, automatically matching the ordered items to the items fulfilled by the picker for each order based on an order's receipt may be prone to errors. Many warehouses may not synchronize fulfilled orders with the online concierge system and may only provide a picker with a printed receipt on checkout. Waiting for delivery of the order to identify problems or other discrepancies may rely on purchasers' correct identification of errors and limit corrections that could be made if the picker were near the warehouse when the error was identified. Analysis of a receipt for an order may be difficult because item descriptions on a receipt (i.e., how an item is labeled on a receipt, termed a receipt item label) may vary significantly due to labeling conventions across warehouses or retailers, or may otherwise deviate from items as described for customer orders while still correctly fulfilling the customer order. These may make it difficult to quickly identify whether a customer order has been correctly fulfilled.

SUMMARY

An online concierge system determines whether a customer order is correctly fulfilled by mapping receipt item labels to order item identifiers. A receipt (e.g., a printed receipt from a warehouse) is captured as an image and is sent to the online concierge system. The receipt image is analyzed with a text recognition algorithm (e.g., optical character recognition (OCR)) to determine a set of receipt item labels that describe fulfilled items according to the description as it appears on the receipt for a particular retailer. The receipt item labels in many cases may not initially have a known correspondence or mapping to the items as described in databases of the online concierge system, such as item identifiers and other data related to the ordered items.

To determine a mapping between receipt item labels and order item identifiers, a group of orders and the associated receipts are used to generate a set of training data. Each of the orders is described as a quantity of ordered items (e.g., one of a first item, three of a second item, five of a third item), such that each ordered item identifier is associated with the number of that item in the order. Similarly, the receipt for that order is analyzed to identify the receipt item labels describing items actually fulfilling the order and a quantity associated with each of the receipt item labels.

Using the set of training data, a computer model is trained to receive receipt item labels and associated quantities as input and to output a quantity of ordered item identifiers. The computer model thus receives a list of quantities of receipt item labels and outputs quantities of ordered item identifiers, learning a many-many association between receipt item labels and ordered items based on the unsupervised training data. The computer model thus may predict multiple ordered item identifiers, wherein a value for each order item identifier is associated with a predicted quantity of that order item identifier.

To convert the learned many-many relationships to mapped relationships for individual receipt item labels, a one-hot encoding for a receipt item label is applied to the computer model to identify predicted order item identifiers for that receipt item label. The one-hot encoding sets the value to zero of all other receipt item labels other than the receipt item label being mapped. Though the model was trained with orders and corresponding receipts having many items, by obtaining outputs relative to a single item, the related model predictions can be used to predict likely ordered items corresponding to that receipt item label. In some cases, the one-hot encoding is an entry of a diagonal matrix input to the model, wherein the diagonal matrix includes a plurality of entries corresponding to individual receipt item labels (e.g., respective one-hot encodings), such that the non-zero output order item identifiers for each entry represents a plurality of predicted order item identifiers for the corresponding receipt item label and can be mapped as likely order item identifiers for that receipt item label. The mapping of each receipt item label and order item identifiers may then be stored by the online concierge system.

When the online concierge system receives a receipt image for an order, the receipt image may be analyzed to extract receipt item labels and then apply the mapping to the set of receipt item labels. Based on the mapping, the online concierge system identifies predicted order item identifiers corresponding to each of the receipt item labels. The predicted order item identifiers may then be compared to order item identifiers from the customer order corresponding to the receipt, enabling the online concierge system to identify potential discrepancies between the customer order and the items actually fulfilled by the picker (as determined from the receipt and identified receipt item labels). Discrepancies may then be flagged by the online concierge system, e.g., for manual review, further processing, or the like, so that incorrectly fulfilled orders or other errors can be quickly identified and addressed.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
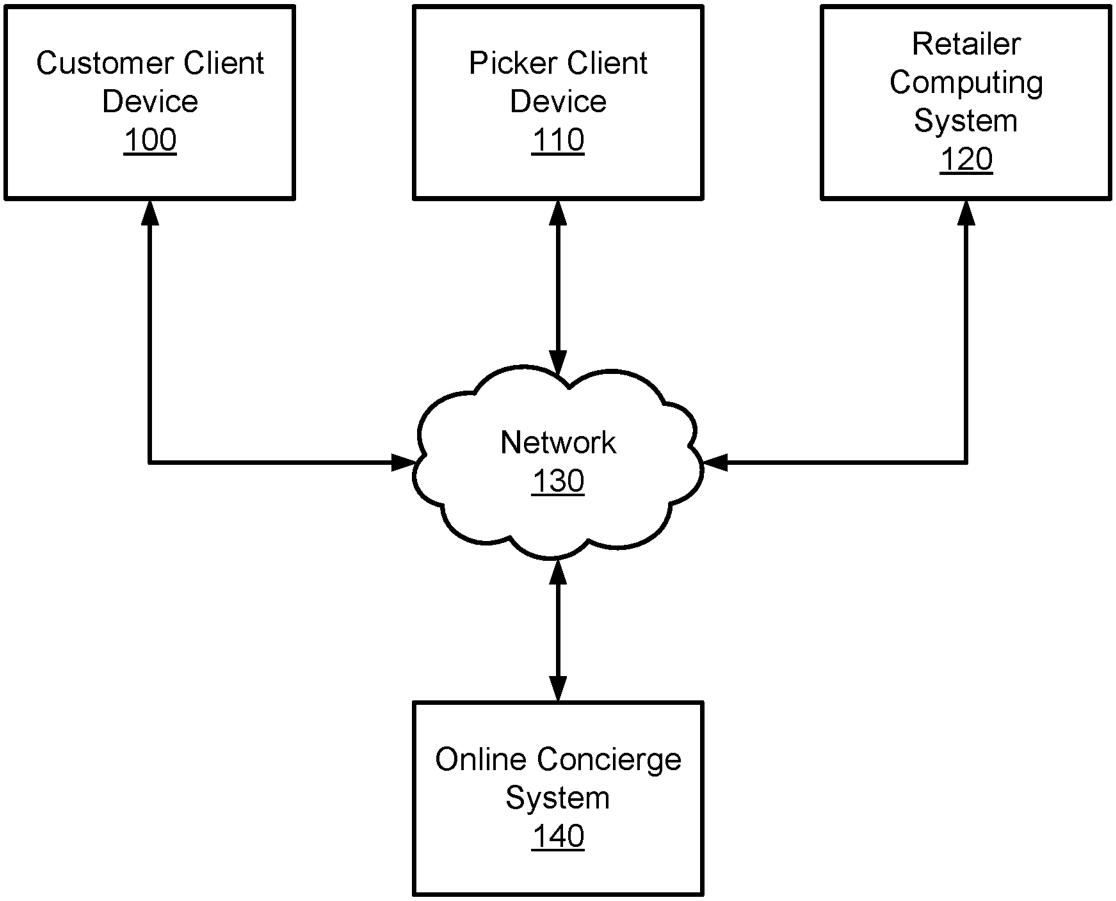
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit (SKU) or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

The picker may also receive a receipt from the retailer location and use the picker client device to capture an image of the receipt and provide the receipt to the online concierge system 140. As discussed further below, the online concierge system 140 extracts label receipt item labels from the receipt and determines what items were actually purchased based on the receipt. When the purchased items (as determined from the receipt image) differs from the ordered items, the online concierge system 140 may identify a discrepancy for correction.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the online concierge system 140 may analyze a receipt image for the order to verify that the picked items match the ordered items and the picker delivers the groceries to a location transmitted to the picker client device 110 by the online concierge system 140. The online concierge system 140 is described in further detail below with regards to FIG. 2.

Figure 2:
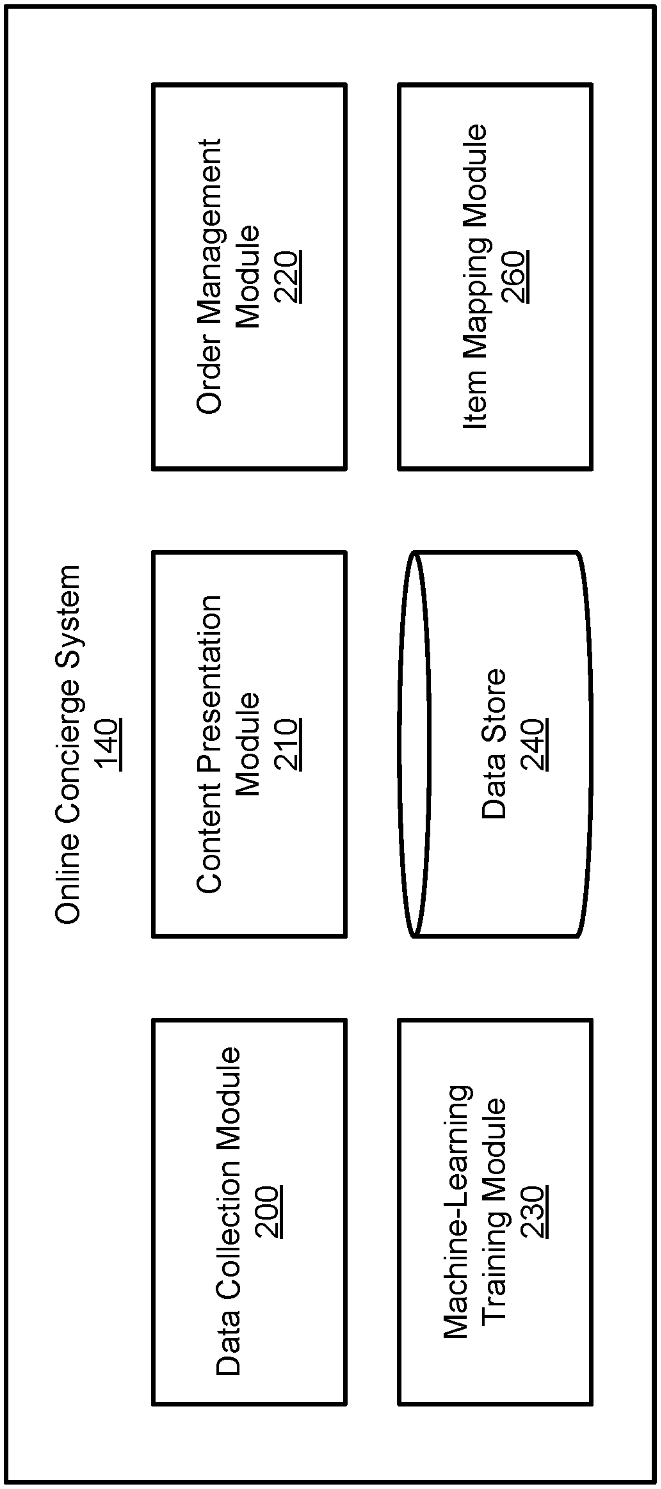
FIG. 2 illustrates an example system architecture for an online concierge system, in accordance with one or more embodiments.

FIG. 2 illustrates an example system architecture for an online concierge system 140, in accordance with one or more embodiments. The system architecture illustrated in FIG. 2 includes a data collection module 200, a content presentation module 210, an order management module 220, a machine-learning training module 230, a data store 240, and an item mapping module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for an item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of the order. In some embodiments, the order management module 220 computes an estimated time of arrival of the picker to the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, hierarchical clustering, and neural networks. Additional examples also include perceptrons, multilayer perceptrons (MLP), convolutional neural networks, recurrent neural networks, sequence-to-sequence models, generative adversarial networks, and transformers. A machine-learning models may include components relating to these different general categories of model, which may be sequenced, layered, or otherwise combined in various configurations.

Each machine-learning model includes a set of parameters. The set of parameters for a machine-learning model are used to process an input and generate an output. For example, a set of parameters for a linear regression model may include weights that are applied to each input variable in the linear combination that includes the linear regression model. Similarly, the set of parameters for a neural network may include the respective weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes a set of input data for which machine-learning model generates an output. For example, each training example may include customer data, picker data, item data, or order data. In some cases, the training examples also include a label which represents an expected output (i.e., a desired or intended output) of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model, whereby the machine-learning training module 230 updates parameters of the machine-learning model based on each of the set of training examples. The training examples may be processed together, individually, or in batches. To train a machine-learning model based on a training example, the machine-learning training module 230 applies the machine-learning model to the input data in the training example to generate an output with a current set of parameters. The machine-learning training module 230 scores the output from the machine-learning model using a loss function. A loss function is a function that generates a score for the output of the machine-learning model, such that the score is higher when the machine-learning model performs poorly and lower when the machine learning model performs well. In cases where the training example includes a label, the loss function is also based on the label for the training example. Example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory computer-readable media. The data store 240 uses computer-readable media to store data, and may use databases to organize the stored data.

Mapping Receipt Items to Ordered Items

The online concierge system 140 includes an item mapping module 260 that maps items on receipts to ordered items of customer orders to determine whether customer orders are fulfilled correctly. The item mapping module 260 receives images of receipts associated with customer orders, e.g., an image of a printed receipt from a warehouse or retailer upon completion of a purchase, a scan of a receipt, an upload of a digital receipt, or the like. The item mapping module 260 identifies receipt item labels from the images of receipts and applies an item mapping model to the receipt item labels to determine whether the receipt item labels correspond to ordered item identifiers of the customer order and whether there are any potential discrepancies between the fulfilled items of the order and ordered items. In some embodiments, the online concierge system 140 may analyze each receipt received by the online concierge system 140, or the online concierge system 140 may sample a subset of receipts received by the online concierge system 140. In other embodiments, the online concierge system 140 may analyze receipts received by the online concierge system 140 responsive to a request by a user, e.g., a customer or a picker, of the online concierge system to confirm that a particular customer order is fulfilled correctly.

In some embodiments, the item mapping module 260 applies a text recognition algorithm, such as optical character recognition (OCR), to a receipt image to determine a set of receipt item labels on the receipt. The receipt item labels describe picked items as it appears on the receipt for a particular retailer (as extracted by the text recognition algorithm). In some examples, receipt item labels may include a quantity (e.g., 2 units, 12 oz., or other size or quantity metrics) of the purchased item in addition to the description, or may include other information describing the purchased item, such as price of the purchased item. In some embodiments, the item mapping module 260 may additionally include one or more other image processing algorithms to be applied to receipt images, such as to brighten or sharpen receipt images that may otherwise be difficult for text recognition algorithms to process.

The item mapping module 260 applies an item mapping model to the set of receipt item labels. Item mapping models include a plurality of receipt item labels and map each receipt item label to one or more predicted order item identifiers of the online concierge system 140, the one or more predicted order item identifiers representing a most likely item match for the receipt item label. In some embodiments, item mapping models provide an expected quantity of predicted order item identifiers corresponding to a receipt item label, e.g., a receipt item label of "APL" may be mapped to a predicted order item identifier "apple" with an expected quantity of "1."

In many cases, the way that a particular ordered item appears on receipt for a particular warehouse location may not be directly known or provided by the warehouse. In some embodiments, item mapping models are created by a computer model trained by the machine-learning training module 230. Possible methods for training a computer model to generate item mapping models are discussed further in conjunction with FIGS. 4A-4C. In other embodiments, item mapping models may be generated manually by a user of the online concierge system 140 or may be provided by one or more third-party systems or servers, such as by a retailer system. Item mapping models may be associated with a particular retailer or warehouse, a particular location or instance of a retailer, or may be generalized to one or more retailers or locations of retailers. For example, a retailer STORE12 may have several warehouse locations, which use similar receipt item labels. Accordingly, a single item mapping model may be applied to all warehouse locations for retailer STORE12. Item mapping models may be stored in the data store 240 of the online concierge system 140, or may be stored or hosted remotely for access by the online concierge system 140. In some embodiments, an item mapping model may be used to generate mappings for receipt item labels and stored as the predicted mapping in association with individual receipt item labels. In additional embodiments, an item mapping model may be applied to generate a mapping for receipt item labels of individual receipt images (e.g., the model may be applied on the fly without storing a mapping between receipt item labels and order item identifiers). The mapping of receipt item labels for a receipt image provides a set of predicted order item identifiers that indicate the model-predicted order items based on the receipt item labels.

The item mapping module 260 then evaluates whether the one or more predicted order item identifiers correspond to the set of ordered item identifiers in the customer order. The comparison may identify that the predicted order item identifiers correspond correctly to the set of ordered item identifiers (e.g., each ordered item corresponds to a predicted order item identifier), or the determined correspondence may identify a discrepancy between the predicted order item identifiers and the set of ordered items (e.g., at least one ordered item does not correspond to a predicted order item identifier or vice versa). When the item mapping module 260 determines that the predicted order item identifiers correspond to the set of ordered items, the item mapping module determines that the customer order was fulfilled correctly. When the item mapping module 260 identifies a discrepancy, the item mapping module may determine that the customer order was fulfilled incorrectly or one or more other actions to be taken, e.g., to confirm whether the customer order was fulfilled or correct the incorrect fulfillment.

While discrepancies may represent a customer order being fulfilled incorrectly (e.g., a picker selecting an incorrect item at a warehouse), a picker fulfilling an item at a warehouse that was not on the customer order, or multiple customer orders getting mixed together, discrepancies may also occur under other circumstances than an incorrectly fulfilled customer order. For example, the item mapping module 260 may identify a discrepancy when the item mapping model is incorrect, e.g., is outdated as to the current stock of a retailer, has not had sufficient training data to map a receipt item label to a correct predicted order item identifier, or the like.

When a discrepancy is identified, the item mapping module 260 may flag the customer order for manual review by one or more of an administrator of the online concierge system 140, a picker associated with the customer order, or a customer associated with the customer order. In another embodiment, the item mapping module 260 may transmit an alert to a device of a picker associated with the customer order (e.g., a text message notification, an email, and/or an automated phone call). In another embodiment, the item mapping module 260 may determine that the discrepancy is caused by an incorrect mapping between one or more receipt item labels and one or more predicted order item identifiers (e.g., if a user confirms the receipt item label is correct for a particular order item identifier), and may automatically update the mapping based on the incorrectly mapped receipt item labels and the predicted order item identifiers. In some embodiments, updating the mapping includes retraining the mapping model by the machine-learning training module 230.

In embodiments where the item mapping model identifies at least two predicted order item identifiers for a receipt item label, the item mapping model 260 may determine a correspondence between a second predicted order item identifier and the set of ordered item identifiers before identifying a discrepancy. Thus, even if a first predicted order item identifier for a receipt item label is incorrect (the first predicted order item identifier is not present in the set of order), the item mapping model 260 may determine that a second predicted order item identifier corresponds correctly to an item of the set of ordered items, and that the customer order does not need to be corrected. By evaluating several predicted order item identifiers as potentially-correct items, the receipt item labels can be more effectively matched with multiple order item identifiers when appropriate.

Figure 3A:
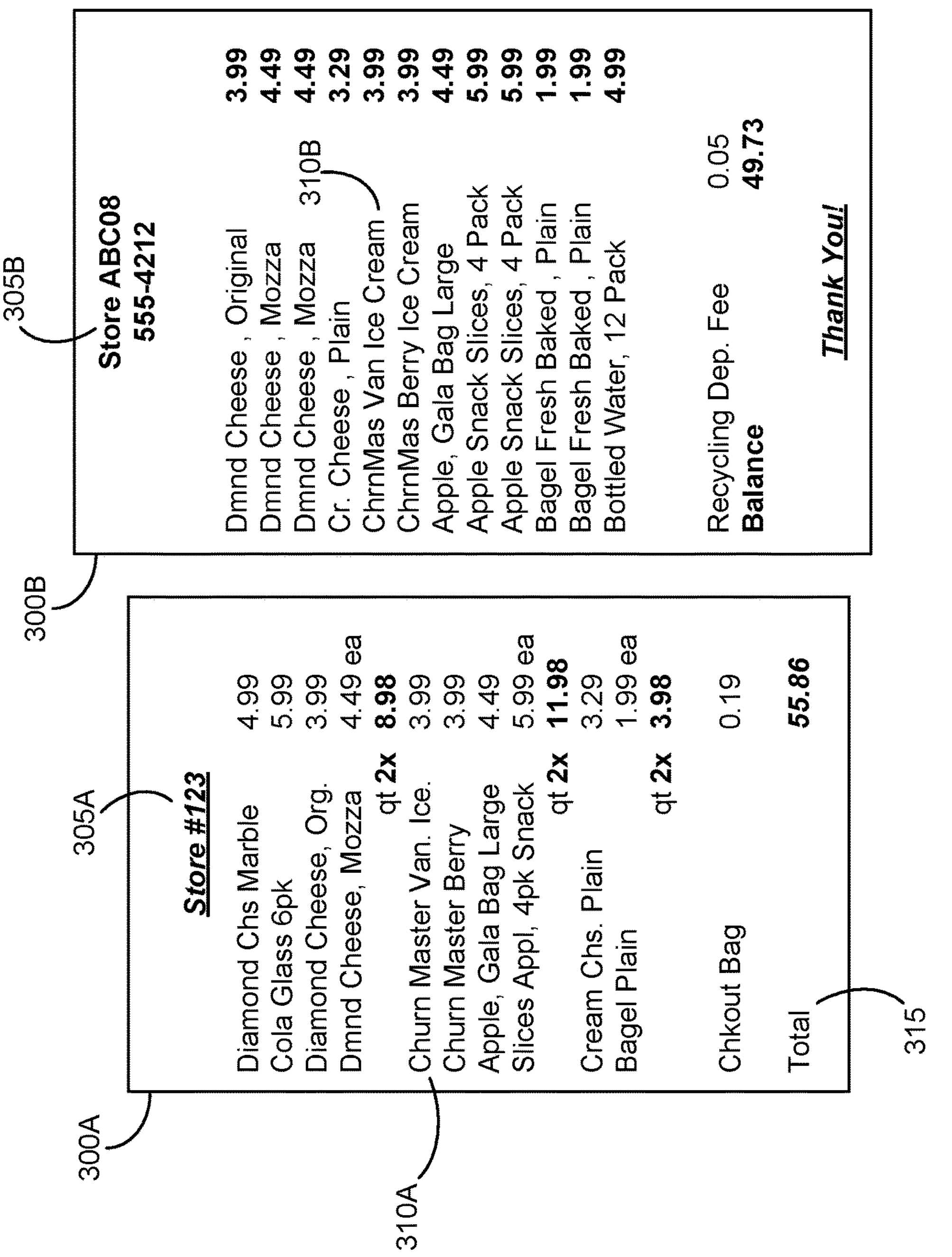
FIGS. 3A-B illustrate example receipts corresponding to customer order items for an online concierge system, in accordance with one or more embodiments.

FIG. 3A illustrates example receipts corresponding to customer orders for an online concierge system, in accordance with one or more embodiments. Each receipt 300A, 300B includes a set of receipt item labels corresponding to items purchased by a picker of an online concierge system 140 to fulfill one or more customer orders. Receipts associated with different retailers, as in the example receipts 300A, 300B, may differ in the type, amount, and formatting of information presented on the receipts. Additionally, the type, amount, and formatting of information presented on receipts may not directly match information stored by the online concierge system 140.

In the example of FIG. 3A, a first receipt 300A is associated with a first retailer 305A, and a second receipt 300B is associated with a second retailer 305B. Each item of the set of receipt item labels may additionally be associated with other information, such as a price corresponding to the item, a quantity of the item purchased, discounts applied to the item, a category of the item, or the like. Further, each receipt 300A, 300B may include additional elements, such as retailer information, bagging or other fees, transaction totals 315, or the like, which may be in different positions or labeled differently across different retailers.

Although similar or identically purchased items may be presented on receipts 300A, 300B, receipt item labels may differ for item descriptions between retailers and/or warehouses. For example, "Churn Master Vanilla Ice Cream" is represented as "Churn Master Van. Ice." 310A in the first receipt 300A, and as "ChrnMas Van Ice Cream" 310B in the second receipt 300B, but both receipt item labels 310A, 310B may correspond to an identical item associated with a single ordered item identifier on the online concierge system 140. To ensure that the online concierge system 140 can correctly identify whether customer orders are fulfilled, both "Churn Master Van. Ice." 310A and "ChrnMas Van Ice Cream" 310B should map to the ordered item identifier "Churn Master Vanilla Ice Cream" on the online concierge system 140. That is, the same ordered item from the perspective of a customer or user may appear differently on receipts from different warehouses and can be accounted for by the different mappings.

Figure 3B:
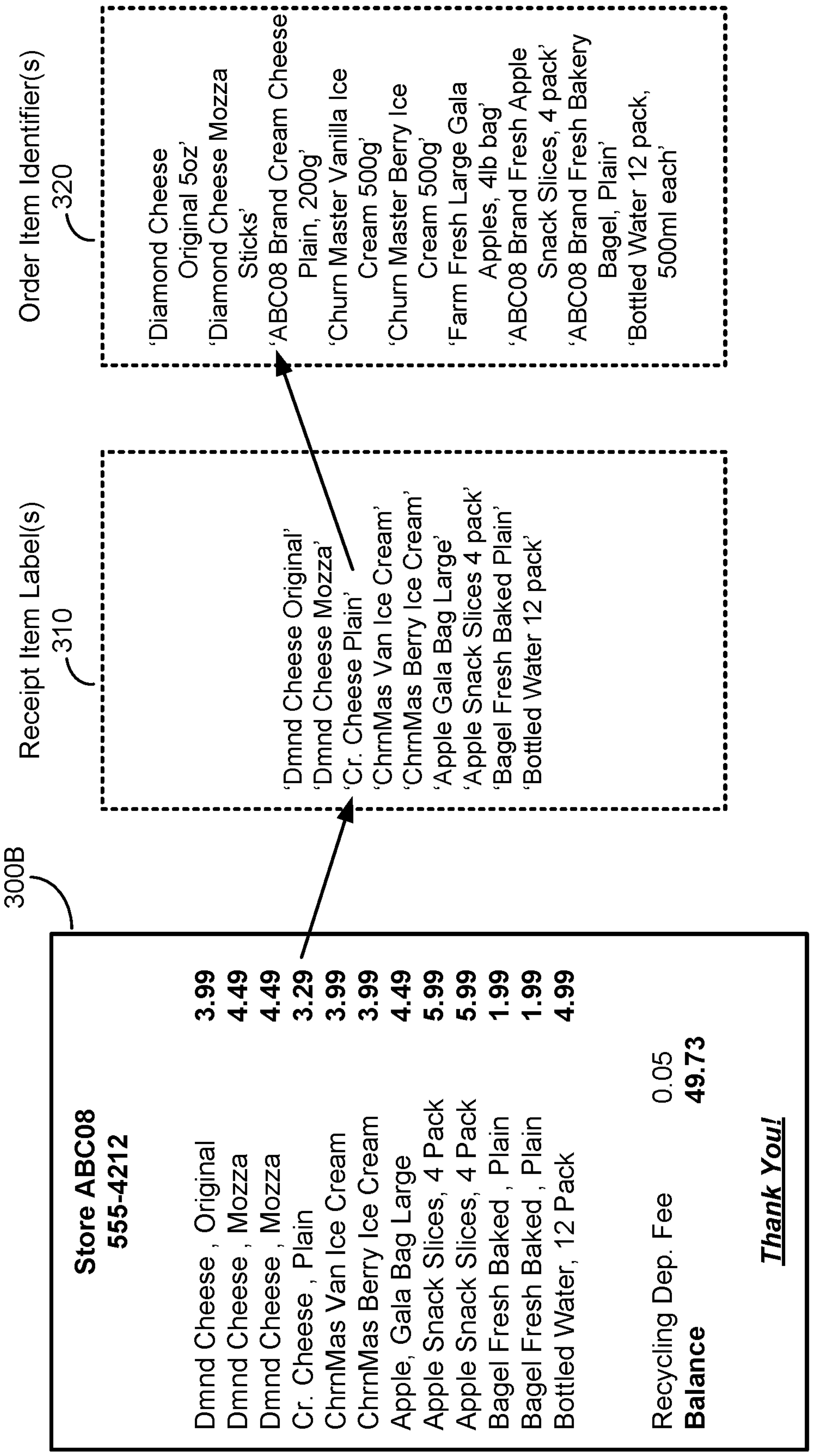

FIG. 3B illustrates an example process for analyzing receipts to identify receipt item labels for comparison to ordered item identifiers. The online concierge system 140 analyzes the example receipt 300B with text recognition (e.g., optical character recognition (OCR) or another process for segmenting and recognizing text from a receipt) to determine a set of receipt item labels 310. In some embodiments, the online concierge system 140 may additionally identify one or more of a quantity associated with each receipt item label of the set of receipt item labels (e.g., "4 pack," "12 pack," or "12 oz."), a price associated with each receipt item label of the set of receipt item labels, or other information identified from the receipt in association with the receipt item labels. In other embodiments, the online concierge system 140 parses the receipt item labels to separate it from additional information. As shown in the example of FIG. 3B, the receipt text "Cr. Cheese, Plain 3.29" may be parsed by the online concierge system 140 as receipt item label "Cr. Cheese Plain" and a value of "3.29" associated with the receipt item label.

Typically, receipt item labels 310 differ from the name or description of an order item identifier 320 as stored by the online concierge system 140. In many cases the receipt item labels 310 may be shortened or condensed, and in some cases may be substantially different from the name of an item for the order item identifiers 320. Thus some receipt item labels 310 may correspond more directly to order item identifiers 320 than others, while others deviate more substantially from order item identifiers. In this example, the receipt item label 310 for "Cr. Cheese Plain" corresponds to an order item identifier 320 "ABC08 Brand Cream Cheese Plain, 200 g" on the online concierge system 140, while the receipt item label for "Bottled Water 12 pack" corresponds to an order item identifier "Bottled Water 12 pack, 500 ml each."

For the online concierge system 140 to accurately determine whether receipt item labels 310 fulfill a customer order having order item identifiers 320, the online concierge system 140 maps receipt item labels to the order item identifiers, including those that deviate in format, language, or label from order item identifiers as stored by the online concierge system as shown.

Figure 4A:
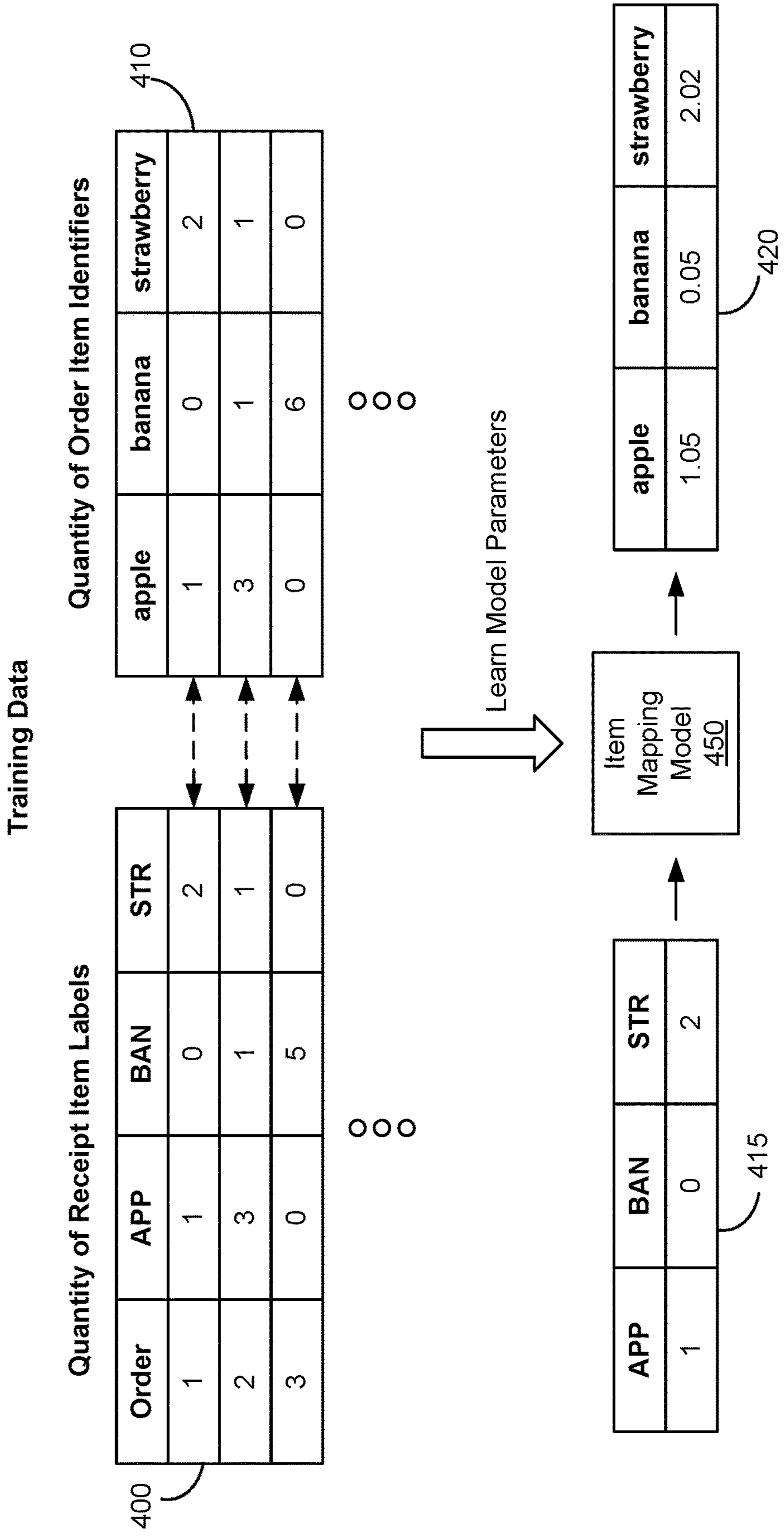
FIGS. 4A-C illustrate an example method for training a computer model to map receipt item labels to predicted order item identifiers, in accordance with one or more embodiments.
Figure 4B:
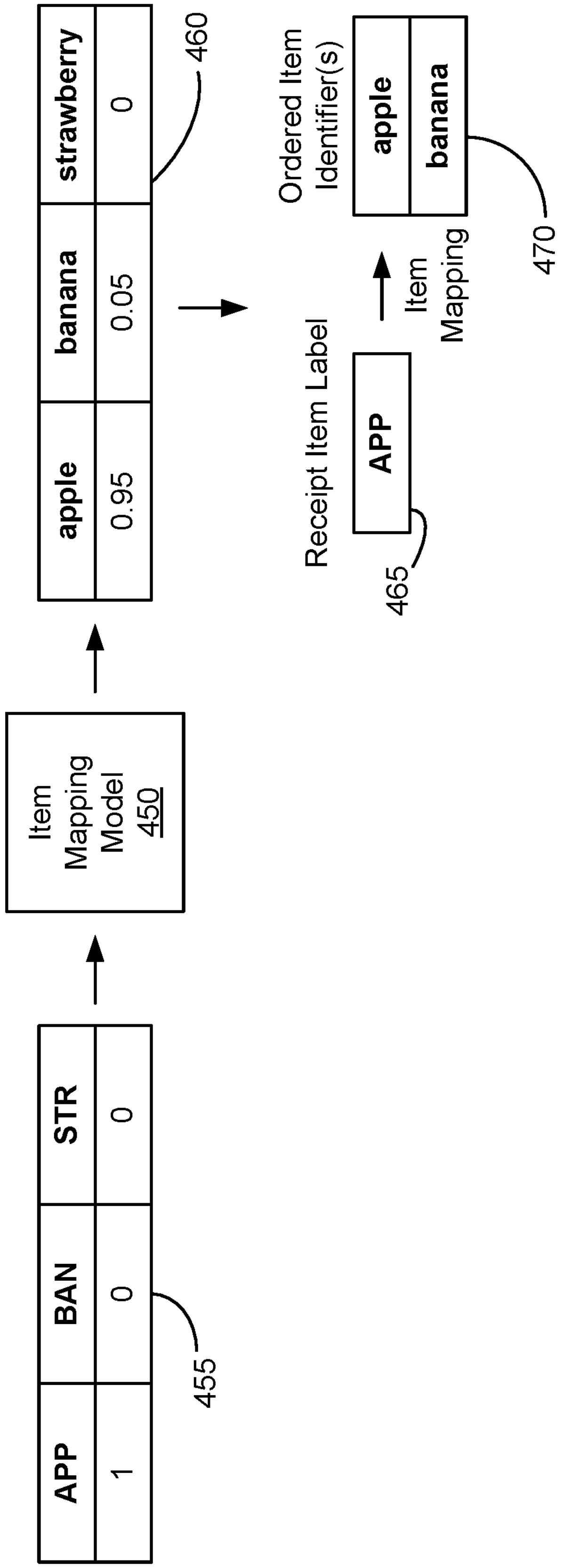
Figure 4C:
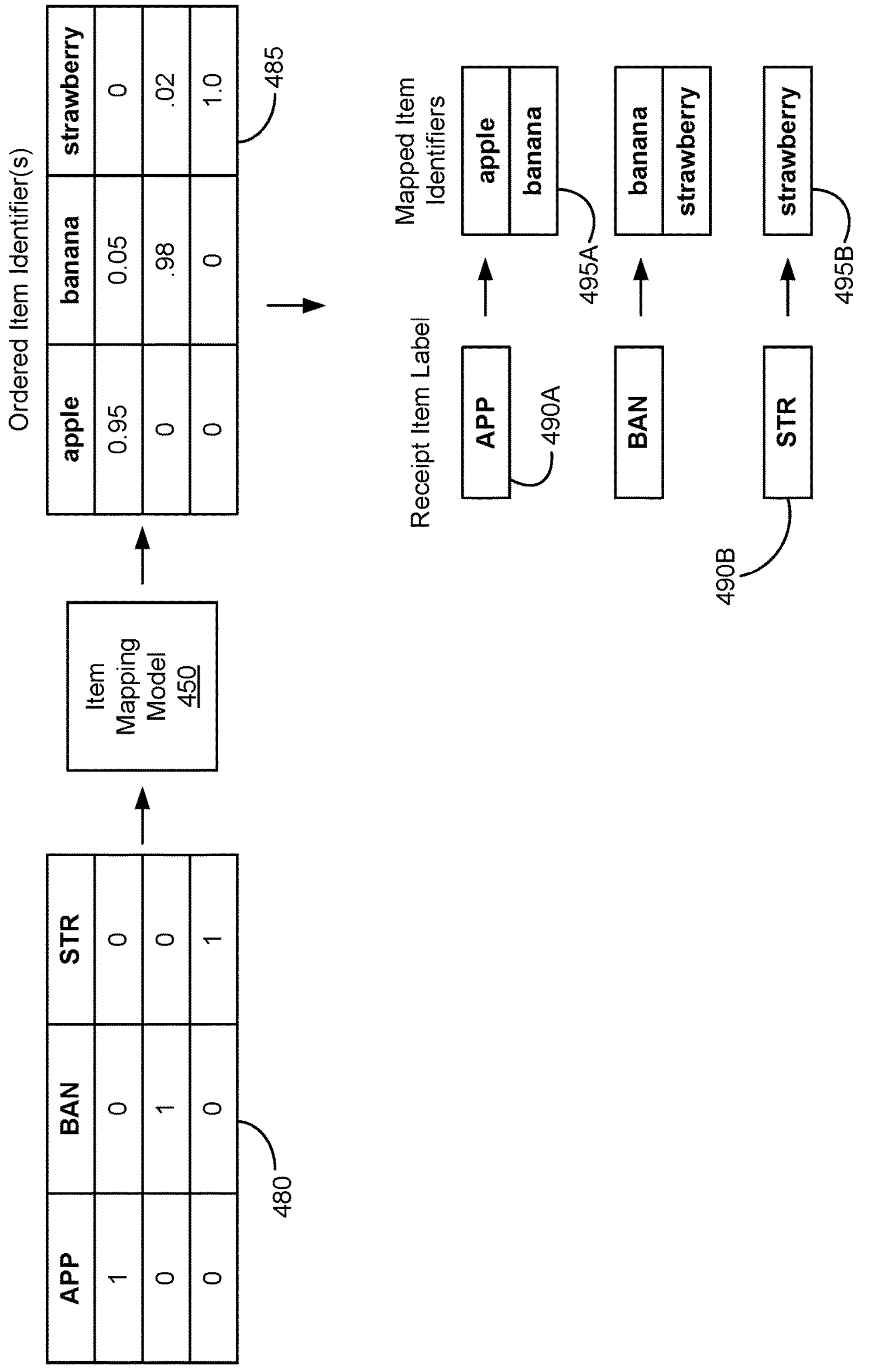

FIG. 4A-4C illustrate an example method for training a computer model to map receipt item labels to predicted order item identifiers, in accordance with one or more embodiments. FIG. 4A illustrates a method for training the computer model using an example training data set 400, 410. The training data for the computer model includes orders and associated receipt images, such that the particular ordered items and related quantities are associated with the corresponding receipt item labels and quantities. Typically, orders may include any number of any of the available order item identifiers, and the fulfilled order is expected to have a receipt having the same quantities. In practice, the training data for orders and related receipt item labels include many different ordered items and many different receipt item labels, making a direct association between ordered items and the way the items appear on the receipt image difficult to determine. However, different orders typically do include different combinations and different quantities of items. Thus, the example training data set includes quantities of receipt item labels 400A and corresponding quantities of order item identifiers from customer orders 410A.

The training data 400, 410 is used by the online concierge system 140, e.g., by the machine-learning training module 230 of FIG. 2, to train an item mapping model 450 that receives a set of receipt item labels (and associated quantities) and predicts ordered item identifiers (and related quantities). In some embodiments, the item mapping model 450 is a multi-dimensional regression model. In other embodiments, the item mapping model 450 may be any other suitable machine-learning model, such as, for example, a random forest model or a linear regression model. The online concierge system 140 learns a set of parameters for the item mapping model 450 such that the item mapping model is configured to receive quantities of receipt item labels 415 and to output predicted quantities of predicted order item identifiers 420. The model is thus trained with training data relating to complete orders having many ordered items and many receipt item labels. To extract predictive information captured in the model parameters to map specific receipt items labels (e.g., map a specific receipt item label to one or more specific order item identifiers), after training an input is generated for the model specifying a particular individual receipt item label, such as a "one-hot"

encoding in which the value for a receipt item label of interest is set to 1 (or other non-zero value) and the other receipt item labels are set to zero.

FIG. 4B illustrates an example method for applying one-hot encoding to a trained item mapping model to determine a mapping for a receipt item label. Once the item mapping model 450 is trained, the online concierge system 140 generates a one-hot encoding 455 comprising a set of receipt item labels and respective quantities. For a first receipt item label (e.g., APP), the set of receipt item labels includes the first receipt item label having a quantity of one, e.g., "APP" having a quantity of 1, while all other receipt item labels of the set of receipt item labels are associated with a quantity of zero, e.g., "BAN" and "STR" having a quantity of 0. The one-hot encoding 455 is applied to the item mapping model 450 to generate predicted quantities of predicted order item identifiers 460. As shown in the example of FIG. 4B, the one-hot encoding 455 for "APP" results in an output from the model of a predicted quantity of 0.95 for the order item identifier "apple," a predicted quantity of 0.05 for the order item identifier of "banana," and a predicted quantity of 0 for the order item identifier of "strawberry."

Based on the predicted order item identifiers 460 generated by the item mapping model 450, the online concierge system 140 determines a mapping for the receipt item label 465 to one or more ordered item identifiers 470, e.g., that the receipt item label is associated with a greater than zero predicted quantity for the corresponding ordered item identifiers. In the example of FIG. 4B, the online concierge system 140 determines that the receipt item label 465 "APP" maps to an ordered item identifier 470 "apple" and "banana." In some embodiments, the online concierge system 140 stores the receipt item label in association with all predicted order item identifiers, e.g., such that "APP" is stored in association with both "apple" and "banana." In other embodiments, the online concierge system 140 stores the receipt item label in association with a predicted order item identifier having a predicted quantity closest to 1, e.g., such that "APP" is stored in association with "apple."

The online concierge system 140 may apply a one-hot encoding 455 to the item mapping model 450 for each receipt item to obtain respective model outputs. The outputs of the one-hot encodings 455 may be used to determine item mappings for all receipt item labels. The item mapping is stored by the online concierge system 140 and may be used to analyze future receipts generated by the retailer for customer orders.

FIG. 4C illustrates an example method for applying a diagonal matrix to a trained item mapping model to determine mappings for receipt item labels represented in the diagonal matrix. Similarly to the example of applying one-hot encodings to the trained item mapping model 450 as described in conjunction with FIG. 4B, the online concierge system 140 may apply a diagonal matrix 480 to the item mapping model to determine mappings for receipt item labels to predicted order item identifiers 485. In some embodiments, the diagonal matrix 480 is a set of unique one-hot encodings, such that each entry (e.g., a row) of the diagonal matrix is a unique one-hot encoding in which a corresponding receipt item label has a quantity of 1 and all other receipt item labels within the entry have quantities of 0. As shown in the example of FIG. 4C, a first entry for a set of receipt item labels "APP" "BAN" "STR" corresponds to quantities of [1, 0, 0], while a second vector for the set of receipt item labels corresponds to quantities of [0, 1, 0], such that no two vectors of the diagonal matrix 480 overlap.

The item mapping model 450 outputs predicted quantities for predicted order item identifiers 485. As previously described, the online concierge system 140 determines a mapping for the receipt item label 490A, B to one or more ordered item identifiers 495A, B based on the output predicted quantities of predicted order item identifiers 485. The item mapping is stored by the online concierge system 140 and may be used to analyze future receipts generated by the retailer for customer orders.

Figure 5:
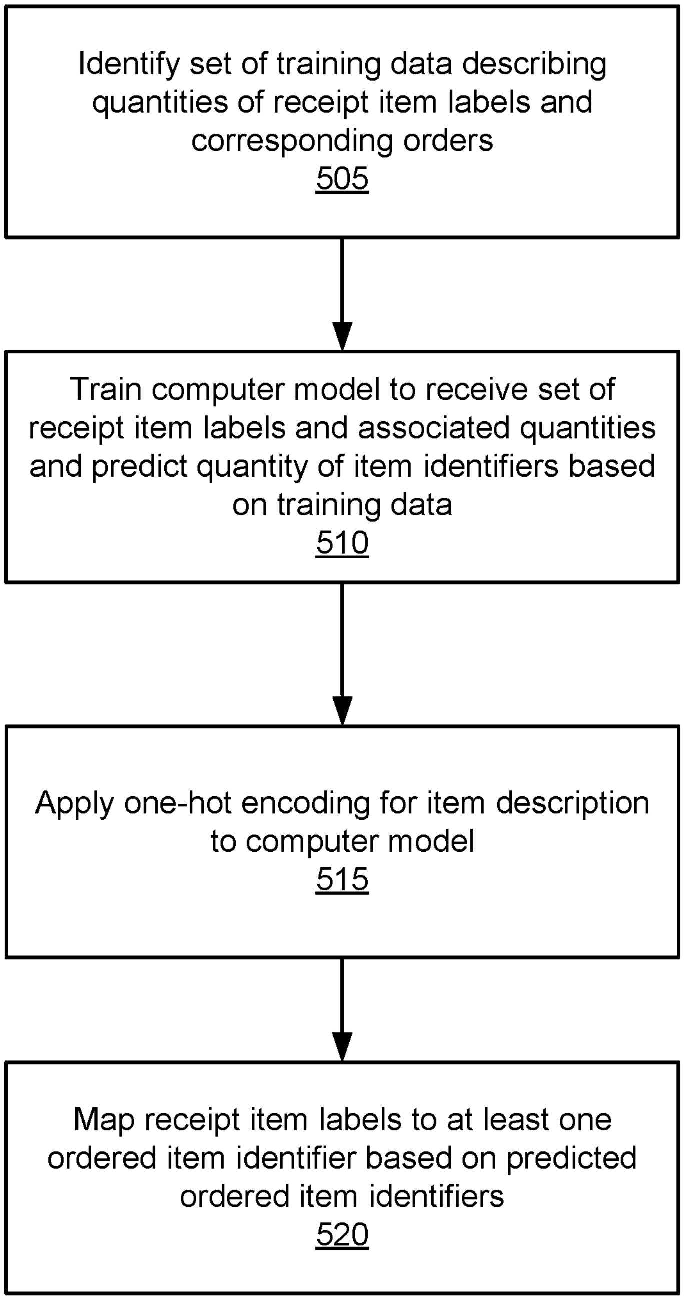
FIG. 5 is a flowchart for training a computer model to map receipt item labels to predicted order item identifiers, in accordance with one or more embodiments.

FIG. 5 is a flowchart for training a computer model to map receipt item labels to predicted order item identifiers, in accordance with one or more embodiments. Alternative embodiments may include more, fewer, or different steps from those illustrated in FIG. 5, and the steps may be performed in a different order from that illustrated in FIG. 5. These steps may be performed by an online concierge system (e.g., online concierge system 140). Additionally, each of these steps may be performed automatically by the online concierge system without human intervention.

The online concierge system 140 identifies 505 a set of training data describing receipt item labels and corresponding orders. Each of the receipt item labels describes an item selected for fulfillment by a picker of the online concierge system 140 with an item description as it appears a receipt, and is associated with a quantity of the item purchased. In some embodiments, the receipt item labels may be further associated with additional information, such as a price of the item purchased. Similarly, each corresponding order identifies an ordered item requested by a customer of the online concierge system 140 and a quantity of the ordered item requested. In some embodiments, the set of training data corresponds to a particular retailer of the online concierge system 140. In some embodiments, the set of training data may additionally include data provided by manual review of the order, or data provided by a retailer associated with the completed order.

The online concierge system 140 trains 510 a computer model with the training set to receive sets of receipt item labels and their associated quantities and to predict as output a quantity of predicted order item identifiers of a corresponding customer order. In some embodiments, the computer model is a multi-dimensional regression model. In other embodiments, the computer model may be any suitable machine learning model, such as a random forest model or a linear regression model.

The online concierge system 140 applies 515 one-hot encoding of receipt item labels to the trained computer model to determine one or more predicted order item identifiers. In some embodiments, the one-hot encoding is an entry in a diagonal matrix comprising a plurality of receipt item labels, and the online concierge system 140 applies the diagonal matrix to the trained computer model to determine predicted order item identifiers for each entry of the diagonal matrix.

Based on the predicted order item identifiers, the online concierge system 140 maps 520 each receipt item labels to at least one ordered item identifier. In some embodiments, the online concierge system 140 maps receipt item labels to a most likely ordered item identifier, e.g., a predicted order item identifier having a highest predicted quantity value output from the computer model. In other embodiments, the online concierge system 140 maps receipt item labels to multiple predicted ordered item identifiers having predicted output quantities greater than zero. The online concierge system 140 may then store the mapped receipt item labels and corresponding predicted ordered item identifiers as an item mapping to be applied to receipt item labels for future customer orders from the particular retailer.

Figure 6:
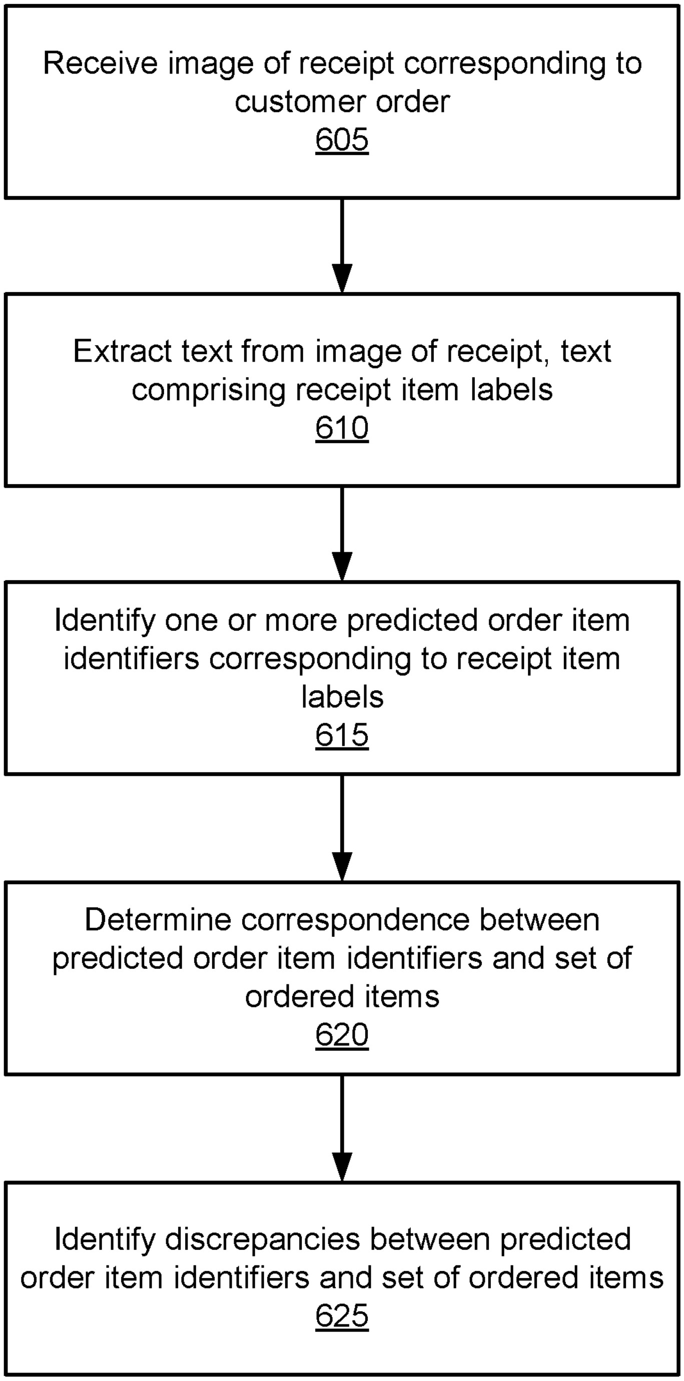
FIG. 6 is a flowchart for applying a computer model to receipt item labels to determine discrepancies between receipt item labels and customer orders, in accordance with one or more embodiments.

FIG. 6 is a flowchart for applying a computer model to receipt item labels to determine discrepancies between receipt item labels and customer orders, in accordance with one or more embodiments. Alternative embodiments may include more, fewer, or different steps from those illustrated in FIG. 6, and the steps may be performed in a different order from that illustrated in FIG. 6. These steps may be performed by an online concierge system (e.g., online concierge system 140). Additionally, each of these steps may be performed automatically by the online concierge system without human intervention.

The online concierge system 140 receives 605 an image of a receipt corresponding to a customer order and extracts 610 text from the image of the receipt. The extracted text includes a set of receipt item labels. In some embodiments, the set of receipt item labels may additionally include one or more quantities of purchased items, prices associated with purchased items, or other information associated with the receipt item labels. The online concierge system 140 may perform one or more processing steps to extract the text from the image of the receipt, such as brightening or modifying the received image, and may extract the text from the image of the receipt using any suitable method of text recognition, such as optical character recognition (OCR).

The online concierge system 140 identifies 615 one or more predicted order item identifiers corresponding to the receipt item labels based on a mapping stored by the online concierge system. In some embodiments, the online concierge system 140 may store one or more mappings corresponding to one or more retailers, and may apply a mapping to the receipt item labels based on a retailer associated with the customer order and/or with information identified from the image of the receipt. In some embodiments, the online concierge system 140 additionally identifies a predicted quantity of predicted order item identifiers corresponding to the receipt item labels.

The online concierge system 140 determines 620 a correspondence between the predicted order item identifiers and the set of ordered item identifiers of the customer order. In some embodiments, the online concierge system 140 additionally determines a correspondence between quantities of the predicted order item identifiers and quantities of the set of ordered item identifiers of the customer orders. Based on the correspondence, the online concierge system 140 identifies 625 discrepancies between the predicted order item identifiers and the set of ordered items.

As discussed above, discrepancies may occur between the predicted order item identifiers and the set of ordered items for various reasons. For example, an incorrect mapping may cause a discrepancy to occur. In another example, a picker determining that an ordered item is out of stock and selecting a replacement item for the out-of-stock ordered item may cause a discrepancy to occur, while still correctly fulfilling the customer order. However, discrepancies may also occur when pickers incorrectly fulfil the customer order, e.g., by purchasing an incorrect or unsuitable item.

In some embodiments, the online concierge system 140 may perform one or more actions responsive to identifying a discrepancy between the predicted order item identifiers and the set of ordered items. For example, the online concierge system 140 may identify the customer order for manual review by one or more of an administrator of the online concierge system, a picker associated with the customer order, or a customer associated with the customer order.

In another example, the online concierge system 140 may determine that the discrepancy is caused by an incorrect mapping between one or more receipt item labels and one or more predicted order item identifiers, and may automatically update the mapping based on the incorrectly mapped receipt item labels and the predicted order item identifiers. Automatically updating the mapping based on the incorrectly mapped receipt item labels and the predicted order item identifiers may include, for example, modifying the mapping entry associated with the receipt item labels, retraining the item mapping model based on an updated set of training data, or notifying a user of the online concierge system 140 to manually correct the mapping.

In other examples, the online concierge system 140 may identify at least two predicted order item identifiers corresponding to a receipt item label, and, responsive to identifying a discrepancy between a first predicted order item identifier and the set of ordered items, may determine a correspondence between the second predicted order item identifier and the set of ordered items. In other examples, the online concierge system 140 may determine one or more suitable replacement order item identifiers corresponding to the set of ordered items and may determine a correspondence between the predicted order item identifiers and the one or more suitable replacement order item identifiers, such that a discrepancy caused by a suitable replacement item being purchased is not flagged for review.

In other embodiments, the online concierge system 140 may perform other actions intended to correct an identified discrepancy between the predicted order item identifiers and the set of ordered items. Identified discrepancies that are not caused by incorrect mappings, suitable replacement items, or other similar factors, are thus identified for review, enabling incorrectly fulfilled customer orders to be quickly identified by the online concierge system 140 and corrected before reaching customers.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example; comparing an output of the machine-learning model to the label associated with the training example; and updating weights associated for the machine-learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

accessing a set of training examples, wherein each training example comprises a plurality of textual receipt item labels, a quantity associated with each textual receipt item label, and a plurality of training labels, wherein each of the plurality of training labels comprises an item identifier and a quantity associated with the item identifier;

training a machine-learning model based on the set of training examples using a many-to-many training process, wherein the machine-learning model is trained to receive a set of textual receipt item labels and associated quantities and predict a set of item identifiers and quantities, wherein training the machine-learning model based on a training example of the set of training examples comprises:

inputting the plurality of textual receipt item labels and the quantity associated with each textual receipt item label to the machine-learning model;

receiving, from the machine-learning model, a predicted set of item identifiers and a predicted set of quantities;

computing a loss score by comparing the predicted set of item identifiers and the predicted set of quantities to the item identifier and the quantity associated with the item identifier; and updating parameters of the machine-learning model based on the loss score;

applying a diagonal matrix to the machine-learning model to map item identifiers of the set of item identifiers to the set of textual receipt item labels, wherein the diagonal matrix includes a set of rows, each row corresponding to a unique one-hot encoding in which a corresponding textual receipt item label has a quantity of 1 and all other textual receipt item labels within the respective row have quantities of 0;

receiving, from the machine-learning model, predicted quantities for predicted item identifiers corresponding to the textual receipt item labels with quantities of 1 in the diagonal matrix;

storing, by the machine-learning model, a mapping of each textual receipt item label that has a quantity of 1 in the diagonal matrix to an item identifier based on the predicted item identifiers and the predicted quantities for the predicted item identifiers;

receiving a receipt associated with a customer order, wherein the receipt comprises one or more textual receipt item labels and wherein the customer order comprises a set of order item identifiers for a set of ordered items;

based on the mapping of each textual receipt item label, identifying the one or more predicted item identifiers corresponding to the textual receipt item labels;

determining a correspondence between the one or more predicted item identifiers to the set of ordered items;

determining a discrepancy between the one or more predicted item identifiers of the predicted item identifiers and a set of ordered items; and flagging a customer order for manual review.

2. The method of claim 1, wherein the machine-learning model is a multi-dimensional regression model.

3. The method of claim 1, wherein the machine-learning model is one or more of: a random forest model or a linear regression model.

4. The method of claim 1, wherein mapping each textual receipt item label comprises mapping the textual receipt item label to a plurality of predicted item identifiers having a predicted quantity greater than zero.

5. The method of claim 1, wherein determining the correspondence between the one or more predicted item identifiers to the set of ordered items comprises:

identifying at least two predicted item identifiers corresponding to a textual receipt item label of the textual receipt item labels; and responsive to determining the discrepancy between a first predicted item identifier of the at least two predicted item identifiers and the textual receipt item label, determining the correspondence between a second predicted item identifier of the at least two predicted order item identifiers and the textual receipt item label.

6. A non-transitory computer readable storage medium having instructions encoded thereon that, when executed by a processor, cause the processor to:

access a set of training examples, wherein each training example comprises a plurality of textual receipt item labels, a quantity associated with each textual receipt item label, and a plurality of training labels, wherein each of the plurality of training labels comprises an item identifier and a quantity associated with the item identifier;

train a machine-learning model based on the set of training examples using a many-to-many training process, wherein the machine-learning model is trained to receive a set of textual receipt item labels and associated quantities and predict a set of item identifiers and quantities, wherein training the machine-learning model based on a training example of the set of training examples comprises:

inputting the plurality of textual receipt item labels and the quantity associated with each textual receipt item label to the machine-learning model;

receiving, from the machine-learning model, a predicted set of item identifiers and a predicted set of quantities;

computing a loss score by comparing the predicted set of item identifiers and the predicted set of quantities to the item identifier and the quantity associated with the item identifier; and updating parameters of the machine-learning model based on the loss score;

apply a diagonal matrix to the machine-learning model to map item identifiers of the set of item identifiers to the set of textual receipt item labels, wherein the diagonal matrix includes a set of rows, each row corresponding to a unique one-hot encoding in which a corresponding textual receipt item label has a quantity of 1 and all other textual receipt item labels within the respective row have quantities of 0;

receive, from the machine-learning model, predicted quantities for predicted item identifiers corresponding to the textual receipt item labels with quantities of 1 in the diagonal matrix;

store, by the machine-learning model, a mapping of each textual receipt item label that has a quantity of 1 in the diagonal matrix to an item identifier based on the predicted item identifiers and the predicted quantities for the predicted item identifiers;

receiving a receipt associated with a customer order, wherein the receipt comprises one or more textual receipt item labels and wherein the customer order comprises a set of order item identifiers for a set of ordered items;

based on the mapping of each textual receipt item label, identifying the one or more predicted item identifiers corresponding to the textual receipt item labels;

determining a correspondence between the one or more predicted item identifiers to the set of ordered items;

determining a discrepancy between the one or more predicted item identifiers of the predicted item identifiers and a set of ordered items; and flagging a customer order for manual review.

7. The non-transitory computer readable storage medium of claim 6, wherein the machine-learning model is a multi-dimensional regression model.

8. The non-transitory computer readable storage medium of claim 6, wherein the machine-learning model is one or more of: a random forest model or a linear regression model.

9. The non-transitory computer readable storage medium of claim 6, wherein mapping each textual receipt item label comprises mapping the textual receipt item label to a plurality of predicted item identifiers having a predicted quantity greater than zero.

10. The non-transitory computer readable storage medium of claim 6, wherein determining the correspondence between the one or more predicted item identifiers to the set of ordered items comprises:

identifying at least two predicted item identifiers corresponding to a textual receipt item label of the textual receipt item labels; and responsive to determining the discrepancy between a first predicted item identifier of the at least two predicted item identifiers and the textual receipt item label, determining the correspondence between a second predicted item identifier of the at least two predicted order item identifiers and the textual receipt item label.

11. A system comprising:

a processor that executes instructions; and a non-transitory computer-readable storage medium having instructions executable by the processor for:

accessing a set of training examples, wherein each training example comprises a plurality of textual receipt item labels, a quantity associated with each textual receipt item label, and a plurality of training labels, wherein each of the plurality of training labels comprises an item identifier and a quantity associated with the item identifier;

training a machine-learning model based on the set of training examples using a many-to-many training process, wherein the machine-learning model is trained to receive a set of textual receipt item labels and associated quantities and predict a set of item identifiers and quantities, wherein training the machine-learning model based on a training example of the set of training examples comprises:

inputting the plurality of textual receipt item labels and the quantity associated with each textual receipt item label to the machine-learning model;

receiving, from the machine-learning model, a predicted set of item identifiers and a predicted set of quantities;

computing a loss score by comparing the predicted set of item identifier and the predicted set of quantities to the item identifiers and the quantity associated with the item identifier; and updating parameters of the machine-learning model based on the loss score;

applying a diagonal matrix to the machine-learning model to map item identifiers of the set of item identifiers to the set of textual receipt item labels, wherein the diagonal matrix includes a set of rows, each row corresponding to a unique one-hot encoding in which a corresponding textual receipt item label has a quantity of 1 and all other textual receipt item labels within the respective row have quantities of 0;

receiving, from the machine-learning model, predicted quantities for predicted item identifiers corresponding to the textual receipt item labels with quantities of 1 in the diagonal matrix;

storing, by the machine-learning model, a mapping of each textual receipt item label that has a quantity of 1 in the diagonal matrix to an item identifier based on the predicted item identifiers and the predicted quantities for the predicted item identifiers;

receiving a receipt associated with a customer order, wherein the receipt comprises one or more textual receipt item labels and wherein the customer order comprises a set of order item identifiers for a set of ordered items;

based on the mapping of each textual receipt item label, identifying the one or more predicted item identifiers corresponding to the textual receipt item labels;

determining a correspondence between the one or more predicted item identifiers to the set of ordered items;

determining a discrepancy between the one or more predicted item identifiers of the predicted item identifiers and a set of ordered items; and flagging a customer order for manual review.

12. The system of claim 11, wherein the machine-learning model is a multi-dimensional regression model.

13. The system of claim 11, wherein a textual receipt item label of the one or more textual receipt item labels is associated with a plurality of order item identifiers of the set of order item identifiers having a predicted quantity greater than zero.

* * * * *